US008791931B2

(12) United States Patent
Takuma

(10) Patent No.: US 8,791,931 B2
(45) Date of Patent: Jul. 29, 2014

(54) IMAGE DISPLAY APPARATUS AND IMAGE DISPLAYING METHOD

(75) Inventor: Hirokazu Takuma, Tokyo (JP)

(73) Assignee: Sony Corporation (JP)

( * ) Notice: Subject to any disclaimer, the term of this patent is extended or adjusted under 35 U.S.C. 154(b) by 626 days.

(21) Appl. No.: 13/065,782

(22) Filed: Mar. 30, 2011

(65) Prior Publication Data

US 2011/0248975 A1 Oct. 13, 2011

(30) Foreign Application Priority Data

Apr. 9, 2010 (JP) ................................ P2010-090815

(51) Int. Cl.
*G06F 3/038* (2013.01)
*G09G 5/00* (2006.01)

(52) U.S. Cl.
USPC .............................. 345/207; 345/89; 345/690

(58) Field of Classification Search
USPC ...................... 345/87–89, 102, 207, 690–693
See application file for complete search history.

(56) References Cited

U.S. PATENT DOCUMENTS

| | | | | |
|---|---|---|---|---|
| 2006/0214904 | A1 * | 9/2006 | Kimura et al. | 345/102 |
| 2009/0009456 | A1 * | 1/2009 | Ohshima | 345/89 |
| 2010/0039440 | A1 * | 2/2010 | Tanaka et al. | 345/589 |
| 2010/0245227 | A1 * | 9/2010 | Chen et al. | 345/102 |

FOREIGN PATENT DOCUMENTS

| | | | |
|---|---|---|---|
| JP | 2001045327 | A | 2/2001 |
| JP | 2007-163712 | A | 6/2007 |
| JP | 2007187763 | A | 7/2007 |
| JP | 2007206464 | A | 8/2007 |
| JP | 2007-240798 | A | 9/2007 |
| JP | 2007286458 | A | 11/2007 |

OTHER PUBLICATIONS

Office Actionfrom Japanese Application No. 2010-090815, dated Aug. 27, 2013.

* cited by examiner

*Primary Examiner* — Kimnhung Nguyen
(74) *Attorney, Agent, or Firm* — Lerner, David, Littenberg, Krumholz & Mentlik, LLP

(57) ABSTRACT

An image display apparatus includes: a display panel including an image display area and a dummy pixel area different from the image display area; an optical sensor detecting light emission luminance of the dummy pixel area on the display panel; and a control unit dividing the image display area on the display panel into a plurality of division areas, allowing pixels within the dummy pixel area to perform light emission to the same degree as the light emission of one or a plurality of pixels within each division area, and correcting luminance or chromaticity of the pixels within each division area based on the light emission luminance of the dummy pixel area detected by the optical sensor.

5 Claims, 13 Drawing Sheets

IMAGE DISPLAY APPARATUS AND IMAGE DISPLAYING METHOD

CROSS-REFERENCE TO RELATED APPLICATION

The present application claims priority from Japanese Patent Application No. JP 2010-090815 filed in the Japanese Patent Office on Apr. 9, 2010, the entire content of which is incorporated herein by reference.

BACKGROUND OF THE INVENTION

1. Field of the Invention

The present invention relates to an image display apparatus and an image display method using a self-luminous display panel such as an organic EL (Electro-Luminescence) panel, and more particularly, to a technique for correcting deterioration in light-emission luminance.

2. Description of the Related Art

There have been developed various kinds of display apparatuses displaying an image through self emission of pixels arranged in a matrix form on a display panel. For example, display apparatuses using an organic EL panel have been put into practical use. The organic EL panel is an image display device that has high light-emission luminance of pixels and is excellent in displaying high-luminance images with high precision.

In a standard image signal such as a television broadcast image or a movie image, there are various standards for an aspect ratio which is a ratio between the horizontal length and the vertical length of an image. Therefore, measurements have to be taken in order to display an image with a display apparatus having an aspect ratio different from that of an image signal.

For example, when an image is displayed using an input image signal with a display apparatus having an aspect ratio different from the original aspect ratio of the image signal without changing the aspect ratio of the image, black areas, that is, non-display areas are provided in upper and lower sides or right and left sides of the image to deal with a difference.

FIGS. 12A to 12C are diagrams illustrating examples in which aspect ratios of images are different.

An example of a display raster size of 16:9 is shown in FIG. 12A. An example of a display raster size of 4:3 is shown in FIG. 12B. An example of a display raster size of a cinema scope size (2.35:1) is shown in FIG. 12C.

When the display panel has a size with an aspect ratio of 16:9, an image in FIG. 12A is displayed on the entire panel. When an image with an aspect ratio of 4:3 in FIG. 12B is displayed, non-display portions occur in the right and left sides of the screen. When an image with a cinema scope size in FIG. 12C is displayed, non-display portions occur in the upper and lower sides of the screen.

In FIGS. 12A to 12C, three representative raster sizes are shown. In effect, there are a large number of raster sizes.

When the raster size of an image to be displayed is different, positions of the non-display portions on a screen are different.

Japanese Unexamined Patent Application Publication No. 2007-240798 discloses a technique for detecting and correcting deterioration in light-emission luminance of pixels of a display panel of a display apparatus. In Japanese Unexamined Patent Application Publication No. 2007-240798, dummy pixels are provided in the process of detecting the deterioration to measure an average light-emission luminance of the dummy pixels.

SUMMARY OF THE INVENTION

In the display panel, such as an organic EL panel, with self luminous pixels, light-emitting elements of the pixels deteriorate when displaying images. Therefore, when the light-emitting elements display images for a long time, this problem may arise due to the fact that the light-emission luminance of each pixel deteriorates. Since deterioration characteristics of the light-emission luminance of each pixel are different for each primary color, the deterioration in the light-emission luminance results in changing chromaticity.

Therefore, in the technique disclosed in Japanese Unexamined Patent Application Publication No. 2007-240798, luminance deterioration caused due to the deterioration in the light-emitting element is prevented in an image displayed on the display panel by detecting the deterioration in the light-emitting luminance on the entire screen using dummy pixels and correcting a driving signal of the panel by the detected deterioration in the light-emitting luminance.

As shown in FIG. 12B or 12C, the deterioration in the light emission luminance does not occur in the display pixels in the non-display portions when an image is continuously displayed in the state where the non-display portions occur. Accordingly, when the entire screen is evenly corrected, the light emission luminance becomes strong in the non-display portions due to a difference in the raster size. Therefore, portions with strong luminance and portions with weak luminance occur within one display screen, thereby causing an undesirable result.

In the actual image display apparatus, it is difficult to determine a history of how long an image with a certain raster size is displayed. Moreover, in the related art, correction of the light emission luminance of the pixels is not performed in consideration of the non-display portion occurring due to the difference in the raster size.

In FIG. 13A, a range X in which an image with a size of 16:9 in FIG. 12A is displayed, a range Y in which an image with a size of 4:3 in FIG. 12B is displayed, and a range Z in which an image with a cinema scope size in FIG. 12C is displayed are superimposed on the display panel.

Areas A, B, C, and D within the screen shown in FIG. 13A are areas where an image is displayed and areas where an image is not displayed for the respective ranges. An image with any raster size is displayed in the middle area A in the case of the respective sizes in FIGS. 12A to 12C. However, an image is displayed or not displayed in the other areas B, C, and D depending on the display size. The middle area A is assumed to be an area where the light emission luminance of the pixels deteriorates most rapidly, whereas the other areas are assumed to be areas where the light emission luminance of the pixels deteriorates less.

In FIG. 13B, an example of the deterioration in the light emission luminance is shown for the respective areas shown in FIG. 13A. The horizontal axis represents a time and the vertical axis represents the luminance. For example, the middle area A is assumed to be an area where the luminance deteriorates most rapidly and the four corner areas D are assumed to be areas where the luminance deteriorates least. The areas B and C are assumed to be areas where the luminance deteriorates less rapidly than the area A and more rapidly than the areas D.

In the example of FIGS. 13A and 13B, the images with three sizes shown in FIGS. 12A to 12C are displayed with appropriate time, respectively. When other images with different raster sizes are displayed, the deterioration in the light emission luminance is different from that of FIGS. 13A and 13B.

Moreover, the organic EL display panel has a problem that luminance or chromaticity is changed due to the temperature of the panel. Therefore, even when correction is performed using the temperature, it is necessary to take deterioration in the pixels into consideration. However, when the deterioration in the pixel is different at each position of the pixel, a problem may arise due to the fact that appropriate correction may not be performed.

The organic EL display panel has been described as an example, but any type image display panel with the pixels including the self luminous element has the same problems.

In light of the foregoing, it is desirable to provide a technique for satisfactorily correcting deterioration in an image display panel with pixels including a self luminous element even when images with various raster sizes are displayed.

According to an embodiment of the invention, there is provided a display panel having an image display area and a dummy pixel area different from the image display area. The light emission luminance of the dummy pixel area of the display panel is detected by an optical sensor.

The image display area on the display panel is divided into a plurality of division areas, and pixels within the dummy pixel area are allowed to perform light emission to the same degree as the light emission of one or a plurality of pixels within each division area. After performing display in this manner, luminance or chromaticity of the pixels within each division area is corrected based on the light emission luminance of the dummy pixel area detected by the optical sensor.

Thus, by setting the division areas on the display panel so as to correspond to a raster size displayed on the display panel, deterioration in the pixels in the display area for each raster size can be understood from the detection of the state of the dummy pixels.

According to the embodiment of the invention, the deterioration in the pixels in the image display area of each raster size is understood, and thus the correction of the light emission luminance can be performed in consideration of the raster size.

DESCRIPTION OF THE PREFERRED EMBODIMENTS

Embodiments of the invention will be described in the following sequence.

1. Overview of Color Temperature Correction according to Embodiment (FIGS. 1A to 3H)

Figure 4:
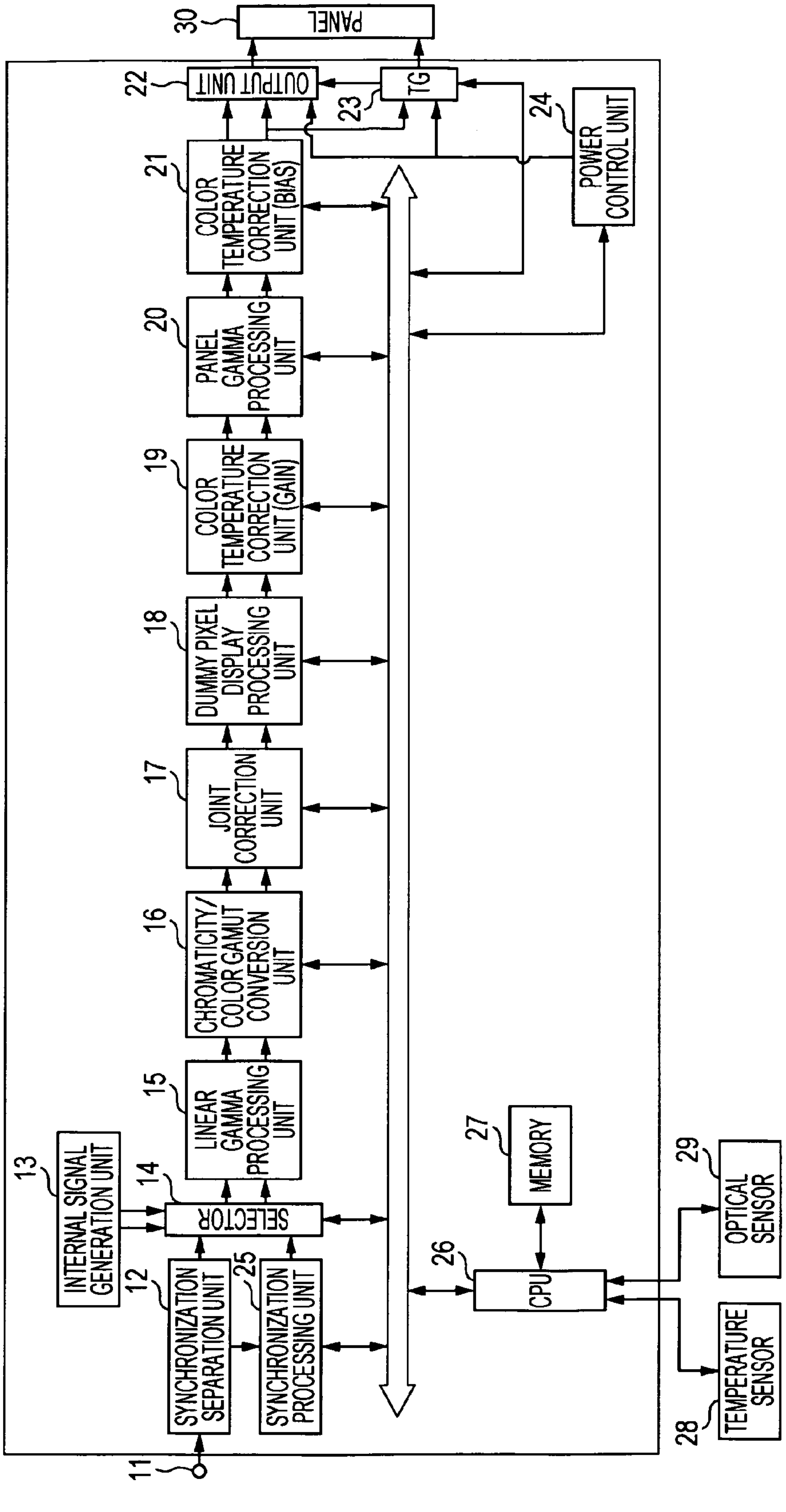
FIG. 4 is a block diagram illustrating an exemplary entire configuration of an image display apparatus according to an embodiment of the invention.
Figure 5:
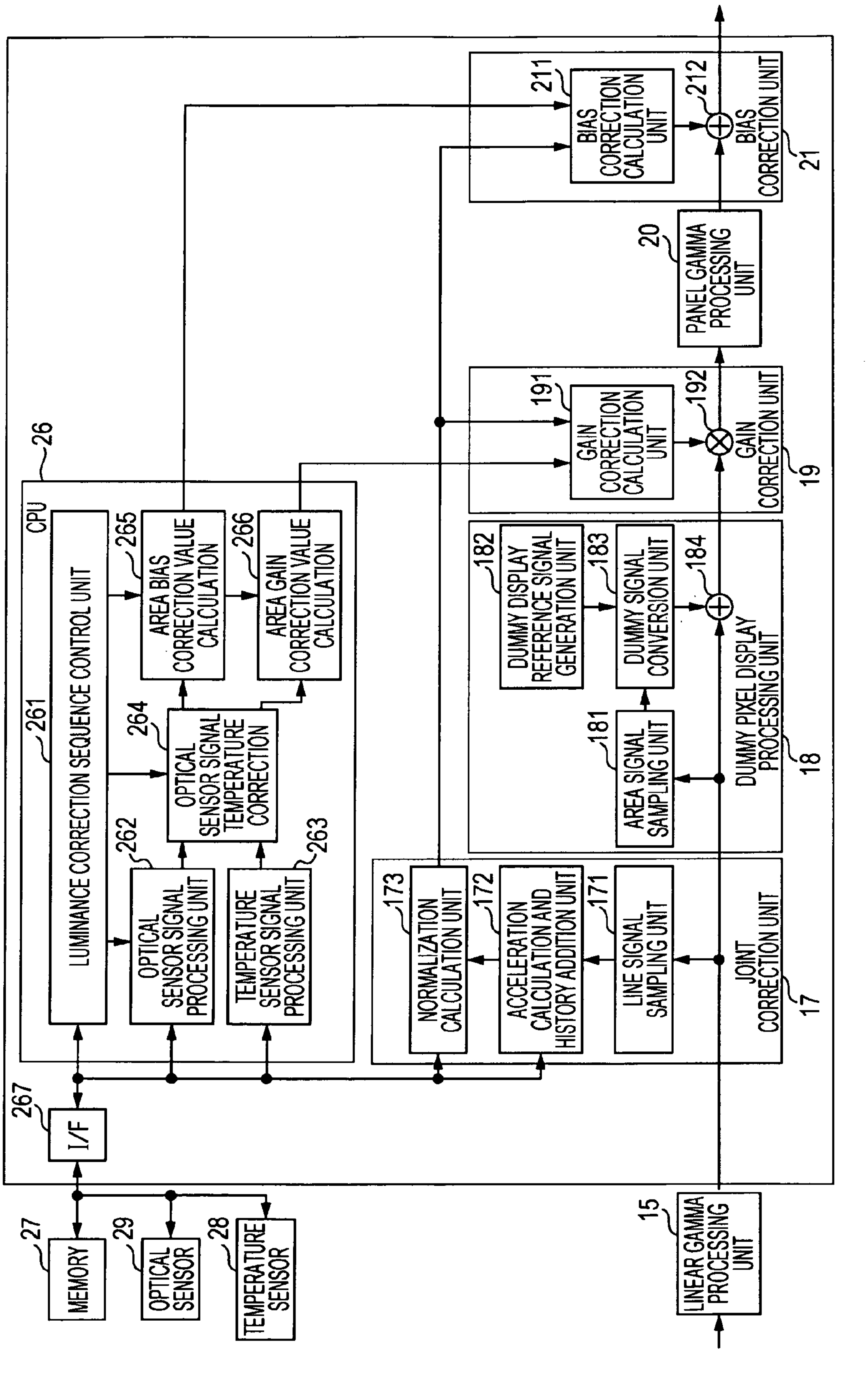
FIG. 5 is a block diagram illustrating exemplary processing configuration associated with color temperature correction of the image display apparatus according to the embodiment of the invention.

2. Configuration of Apparatus according to Embodiment (FIGS. 4 and 5)

Figure 6:
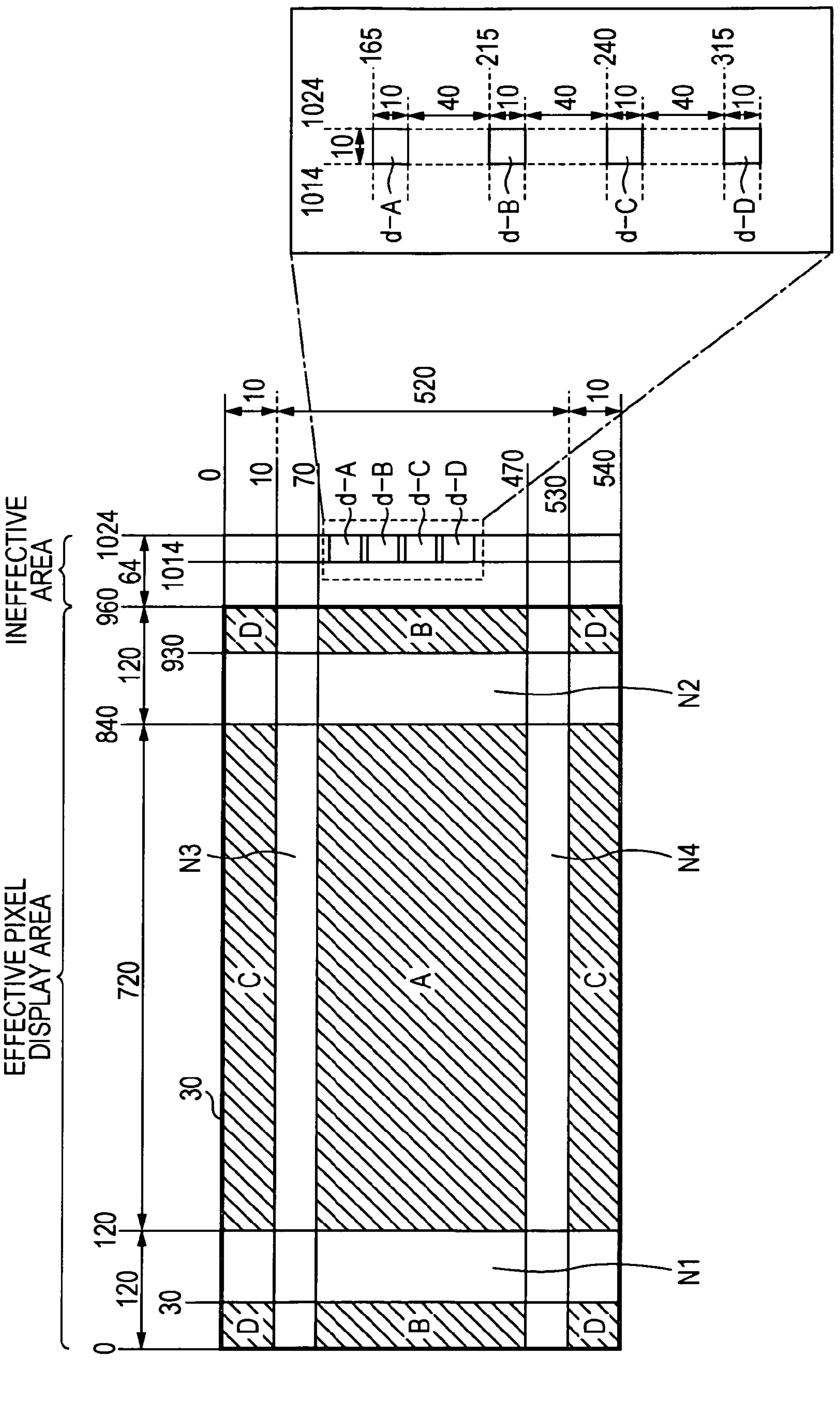
FIG. 6 is a diagram illustrating a detailed example of area division according to the embodiment of the invention.
Figure 7:
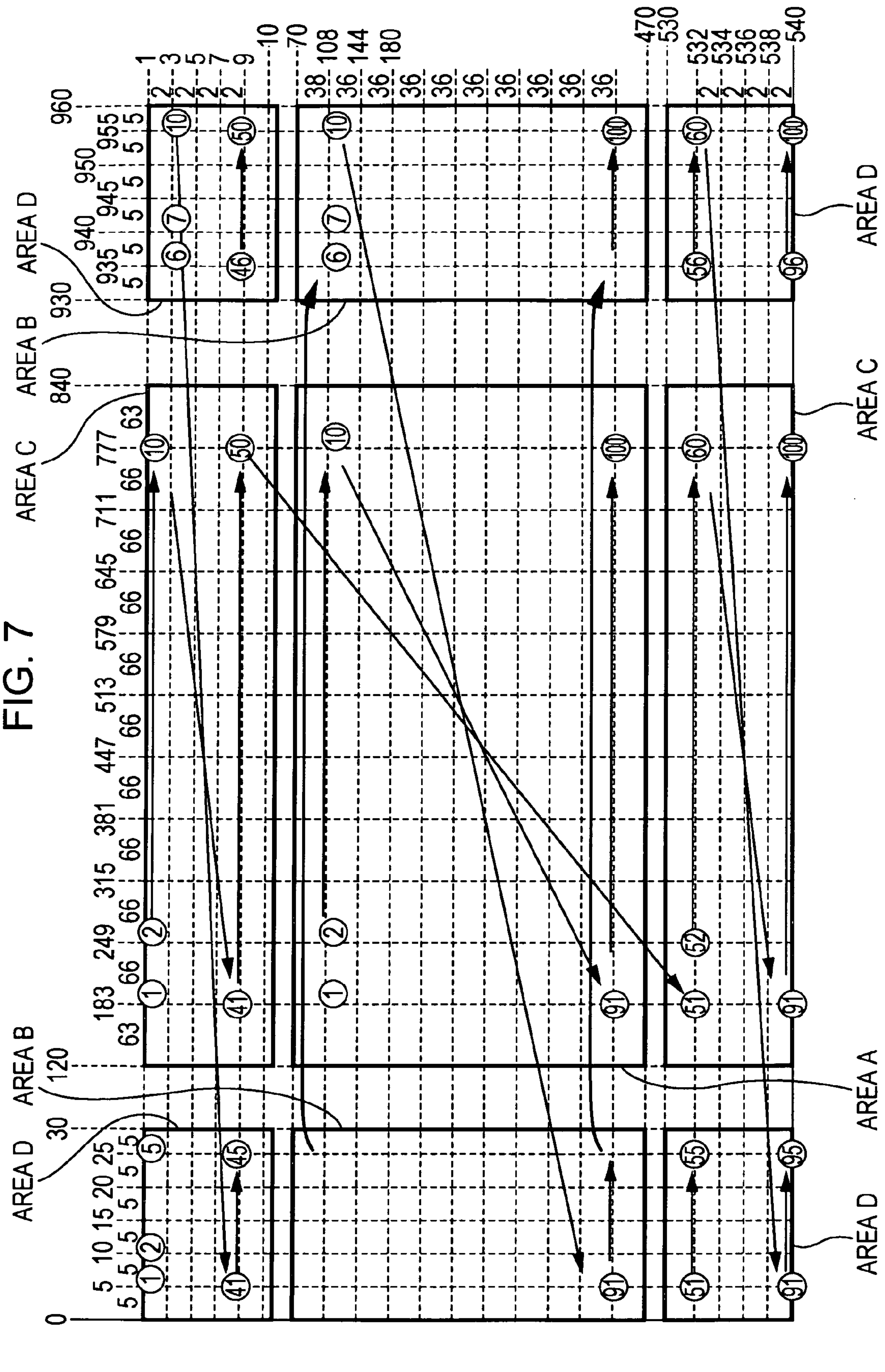
FIG. 7 is a diagram illustrating an example of the positions of sampling pixels of dummy pixels according to the embodiment of the invention.

3. Exemplary Setting of Area division and Dummy Pixel according to Embodiment (FIGS. 6 and 7)

Figure 8A:
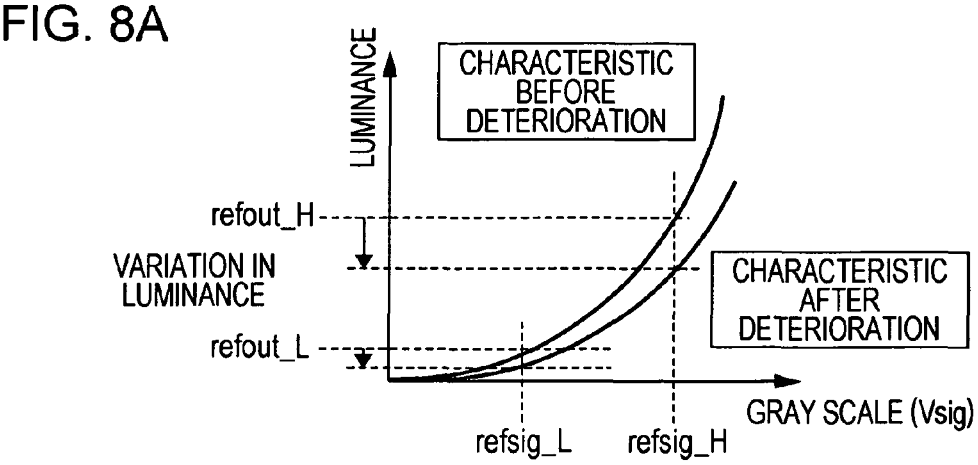
FIGS. 8A to 8C are diagrams illustrating corrected states according to the embodiment of the invention.
Figure 8B:
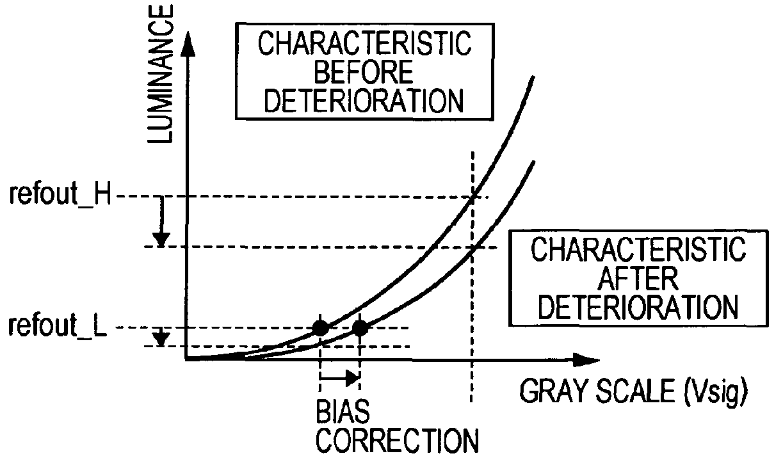
Figure 8C:
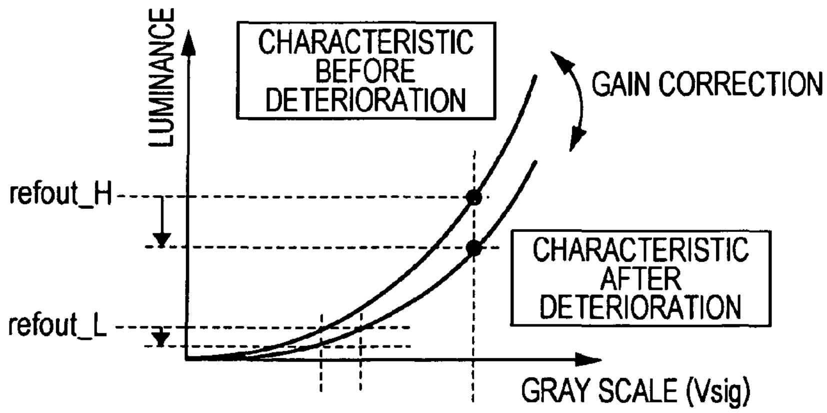

4. Exemplary Correction Processing according to Embodiment (FIGS. 8A to 8C)

5. Exemplary Processing of Joint Area according to Embodiment (FIGS. 9A to 11)

6. Modified Examples

1. Overview of Color Temperature Correction According to Embodiment

First, the overview of color temperature correction according to an embodiment will be described with reference to FIGS. 1A to 3H.

In the embodiment, an organic EL panel in which pixels, each include a self luminous element is used as an image display panel of an image display apparatus.

Figure 1A:
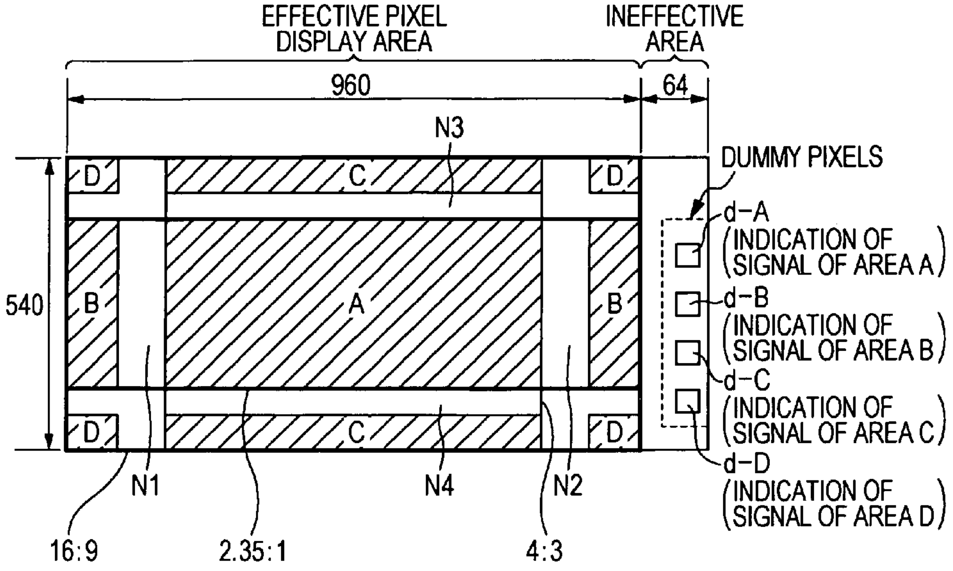
FIGS. 1A and 1B are diagrams illustrating the overview of color temperature correction of using dummy pixels according to an embodiment of the invention.
Figure 1B:
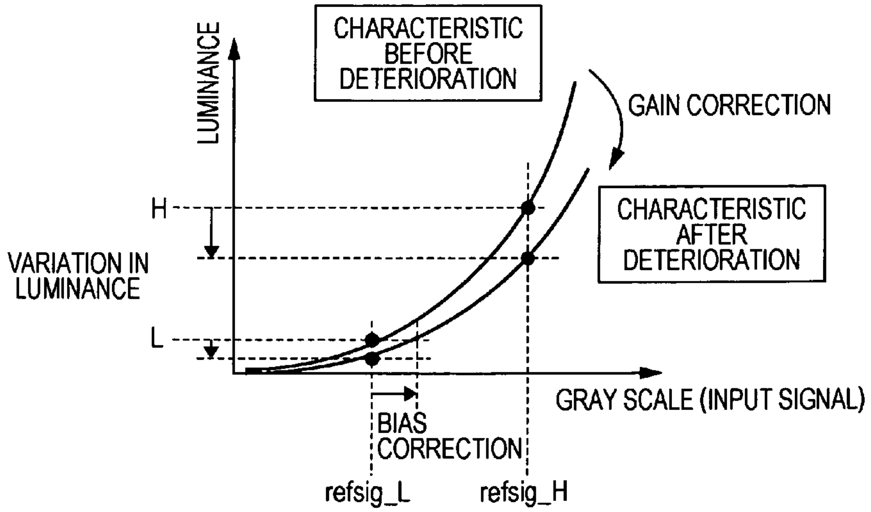

The image display panel has 540 pixels in a vertical direction and 960 pixels in a horizontal direction in an effective image display area, as shown in FIGS. 1A and 1B. As for the pixels, red pixels, blue pixels, and green pixels are sequentially arranged. An ineffective, area (right end area in FIGS. 1A and 1B) adjacent to the effective image display area has 540 pixels in the vertical direction and 64 pixels in the horizontal direction. A part of the ineffective area is used as a dummy pixel area. The ineffective area is an area where display of the pixels of the area is not viewed and which is hidden from the outside of the apparatus. That is, it is configured that users view only the display of the effective image display area.

As shown in FIG. 1A, the effective image display area is configured as an area where the pixels are arranged at an aspect ratio at which an image with a raster size of 16:9 is displayed.

As shown in FIG. 1A, division areas A, B, C, and D are set within the effective image display area.

The division area A is a middle area where an area configured to display an image with a raster size of 2.35:1 and an area configured to display an image with a raster size of 4:3 overlap with each other. The division region A is an area which is within an image display area when images with most raster sizes are displayed.

The division areas B are right and left areas of the middle division area A. Areas N1 and N2 which are not included in the division areas A and B are provided between the middle division area A and the right and left division areas B. In this embodiment, the areas N1 and N2 are referred to as joint areas.

The division areas C are upper and lower areas of the middle division area A. Joint areas N3 and N4 which are not included in the division areas A and C are provided between the middle division area A and the upper and lower division areas C.

The division areas D are four corner areas outside the joint areas N1, N2, N3, and N4.

Four areas of dummy pixel areas d-A, d-B, d-C, and d-D are provided as dummy pixel areas within the ineffective area. The four dummy pixel areas d-A, d-B, d-C, and d-D each include 100 pixels: 10 vertical pixels×10 horizontal pixels.

The dummy pixel area d-A is configured to perform light emission to the same degree as the light emission of 100 pixels. The 100 pixels are selected from the division area A.

Likewise, the dummy pixel areas d-B, d-C, and d-D are each configured to perform light emission to the same degree as the light emission of 100 pixels. The 100 pixels are selected from the corresponding division areas B, C, and D, respectively.

Although not shown in FIGS. 1A and 1B, an optical sensor measuring each light emission luminance is disposed on the display panel of each of the four dummy pixel areas d-A, d-B, d-C, and d-D. The optical sensor detects a variation in the luminance of each of the dummy pixel areas d-A, d-B, d-C, and d-D and calculates the correction values of the slope (gain) and the gray scale (bias) of a signal used to set the luminance of the dummy pixel to be the same as an initial value.

FIG. 1B is a diagram illustrating characteristics of the gray scale (horizontal axis) of an input signal and the variation in the luminance (vertical axis) of a pixel on the panel. In FIG. 1B, a characteristic before deterioration is shown in which the pixels within the image display panel do not deteriorate and a characteristic after deterioration is shown in which the pixels deteriorate after some display.

For example, when the current characteristic detected in the dummy pixel area d-A corresponding to the area A is the characteristic after deterioration shown in FIG. 1B, a signal driving the pixels within the area A is subjected to gain correction and bias correction so as to becomes the characteristic before deterioration shown in FIG. 1A.

Likewise, signals driving the pixels within the division areas B, C, and D are subjected to the gain correction and the bias correction based on the characteristic after deterioration detected in the dummy pixel areas d-B, d-C, and d-D, respectively, so as to become the characteristic before deterioration.

By performing the gain correction and the bias correction, the luminance or chromaticity of the pixels within each of the division areas A, B, C, and D is made to be the same values as an initial value.

In the joint areas N1, N2, N3, and N4, joint correction is performed based on an integrated signal history within each area, and the same gain correction and the same bias correction as those of the division areas A, B, C, and D are performed so as to acquire the characteristic before deterioration. Briefly, the joint correction is performed in such a manner that the joint is inconspicuous, for example, in the joint areas N1 and N2 between the areas A and B in consideration of the corrected state of the area A and the corrected state of the area B. The joint correction will be described below in detail.

In this embodiment, by performing such processing, uniformity of a display image can be maintained in the state where the light emission luminance or chromaticity of each pixel does not deteriorate in the effective image display area of the image display panel.

Hereinafter, the reason for providing the joint areas N1 to N4 will be described with reference to FIGS. 2A and 2B.

Figure 2A:
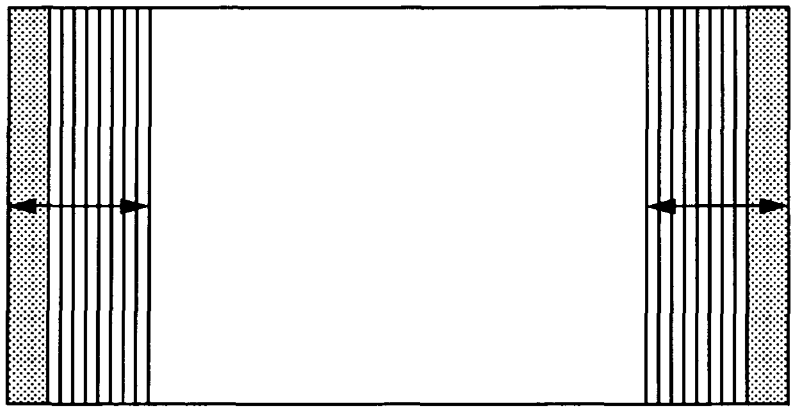
FIGS. 2A and 2B are diagrams illustrating an example of variation in non-display portions due to a difference in a raster size.

In FIG. 2A, when vertically long images are displayed on the image display panel (that is, all pixels in a vertical direction are used for display), a variation in the non-display areas in the right and left ends is shown. Depending on a difference in the raster size, the width of the non-display area in the right and left ends is varied, as indicated by arrows of right and left ends of FIG. 2A.

Figure 2B:
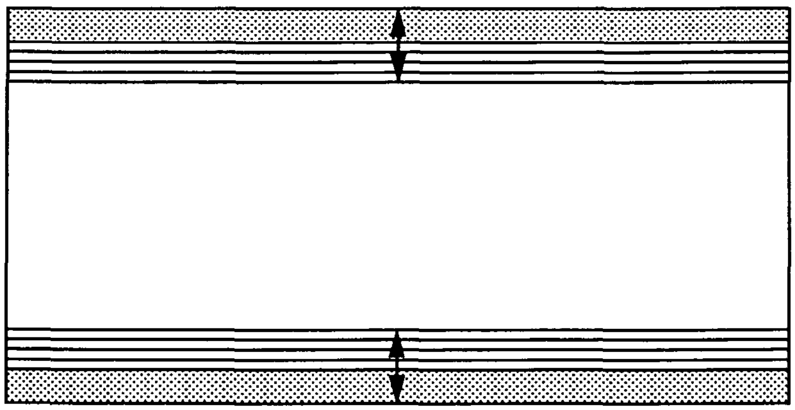

In FIG. 2B, when horizontally long images are displayed on the image display panel (that is, all pixels in a horizontal direction are used for display), a variation in the non-display areas in the upper and lower ends is shown. Depending on a difference in the raster size, the width of the non-display area in the upper and lower ends is varied, as indicated by arrows of upper and lower ends of FIG. 2B.

FIGS. 3A to 3H are diagrams illustrating examples of standard raster sizes. On the left part of the respective examples in FIGS. 3A to 3H, upper and lower or right and left non-display areas are shown when the standard raster sizes are displayed on a screen of 16:9. On the right part of the respective examples in FIGS. 3A to 3H, examples of the number of pixels (dots) are shown when the images with the raster sizes on the left part are displayed on the panel having 540 vertical pixels×960 horizontal pixels.

Figure 3A:
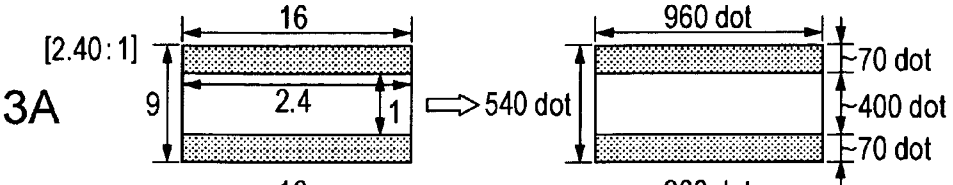
FIGS. 3A to 3H are diagrams illustrating display specifications of various raster sizes.

In FIG. 3A, an example of a raster size of 2.40:1 is shown. An image portion has 400 vertical pixels×960 horizontal pixels.

Figure 3B:
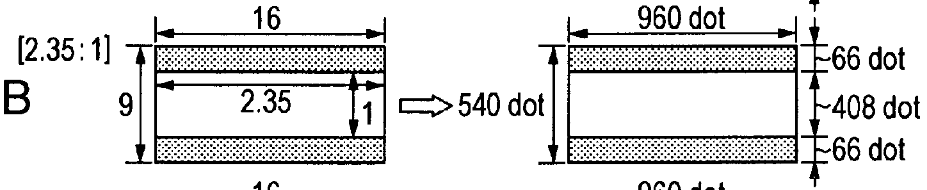

In FIG. 3B, an example of a raster size (cinema scope size) of 2.35:1 is shown. An image portion has 408 vertical pixels×960 horizontal pixels.

Figure 3C:
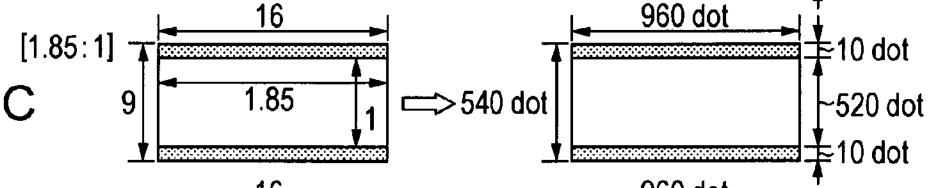

In FIG. 3C, an example of a raster size (American screen size) of 1.85:1 is shown. An image portion has 520 vertical pixels×960 horizontal pixels.

Figure 3D:
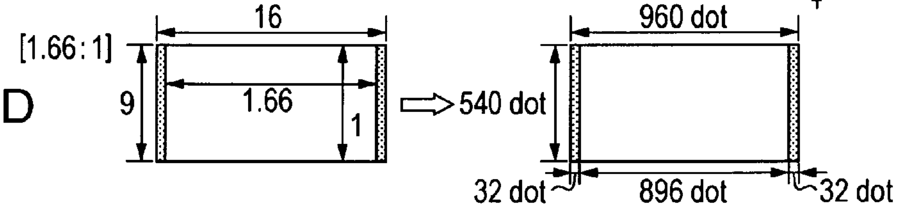

In FIG. 3D, an example of a raster size (European screen size) of 1.66:1 is shown. An image portion has 540 vertical pixels×896 horizontal pixels.

Figure 3E:
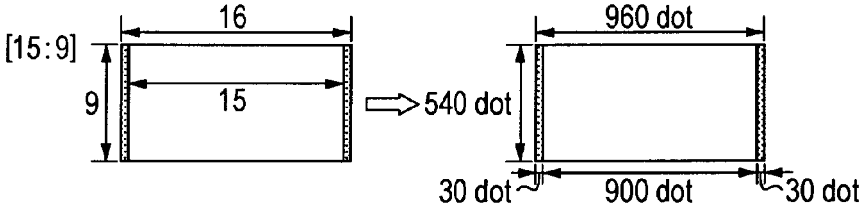

In FIG. 3E, an example of a raster size of 15:9 is shown. An image portion has 540 vertical pixels×900 horizontal pixels.

Figure 3F:
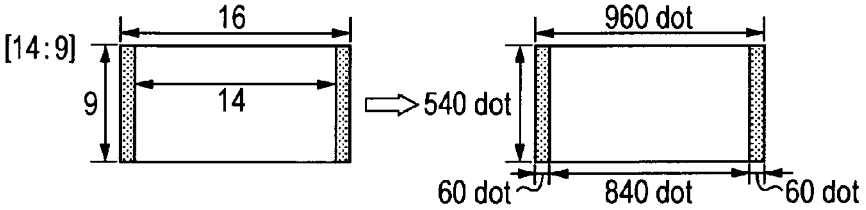

In FIG. 3F, an example of a raster size of 14:9 is shown. An image portion has 540 vertical pixels×840 horizontal pixels.

Figure 3G:
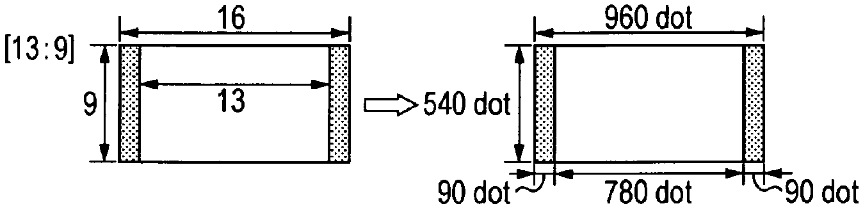

In FIG. 3G, an example of a raster size of 13:9 is shown. An image portion has 540 vertical pixels×780 horizontal pixels.

Figure 3H:
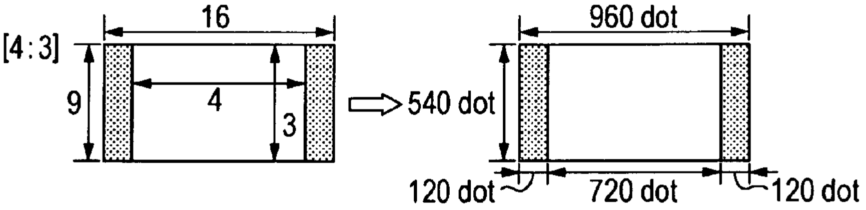

In FIG. 3H, an example of a raster size of 4:3 is shown. An image portion has 540 vertical pixels×720 horizontal pixels.

In this embodiment, the joint areas N1 to N4 are provided in order to absorb the difference in the pixel deterioration caused when an image with each raster size is displayed. That is, as shown in FIGS. 3A to 3H, when there are various raster sizes and images with the raster sizes are appropriately displayed on the display panel, the non-display area is varied, as shown in FIGS. 2A and 2B. Therefore, the deterioration degree is varied within the range in which the non-display area is varied. The variation in the deterioration degree is estimated based on the integrated signal history of each area and appropriate joint correction is performed.

Basically, the boundary between the image portion of the raster size and the non-display portion is configured to be located in the joint areas N1 to N4 or in the boundary between the joint areas and the adjacent division areas. Moreover, correction corresponding to the difference in the raster size is performed in the joint areas N1 to N4.

Hereinafter, the configuration and processed state of the correction performed based on the above-described principle will be described in detail.

2. Configuration of Apparatus According to Embodiment

FIG. 4 is a diagram illustrating an exemplary entire configuration of the image display apparatus according to this embodiment.

Referring to FIG. 4, an image signal input to an image signal input terminal 11, which is an input unit, is supplied to a synchronization separation unit 12 and is separated into image data and synchronization data. The image data is supplied to a selector 14 and the synchronous data is supplied to a synchronization processing unit 25. An image signal stored, read, and generated in an internal signal generation unit 13 within an apparatus or an image signal received and generated in a tuner or the like within the apparatus is supplied to the selector 14. The selector 14 selects one of the image signals.

The selected image data and the synchronous data are supplied to a linear gamma processing unit 15 and are subjected to linear correction processing. The corrected image data and synchronous data are supplied to a chromaticity/color gamut conversion unit 16. The chromaticity/color gamut conversion unit 16 performs chromaticity and color gamut conversion processing on the image data. The image data and the synchronous data processed by the chromaticity/color gamut conversion unit 16 are supplied to the joint correction unit 17 and are subjected to joint correction. The joint correction is the correction on the luminance or chromaticity performed in the joint areas N1 to N4 shown in FIGS. 1A and 1B. The joint correction processing will be described below in detail.

The image data and the synchronous data output by the joint correction unit 17 are supplied to a dummy pixel display processing unit 18. A signal displayed by the dummy pixels within the ineffective area of the image display panel 30 is sampled from the image data and displayed. An example of the sampling of the signal displayed by the dummy pixel will be described below.

The image data and the synchronous data output by the dummy pixel display processing unit 18 are supplied to a color temperature correction unit 19. The color temperature correction unit 19 performs color temperature correction by gain correction based on the detection of the light emission luminance of the dummy pixels.

The image data and the synchronous data output by the color temperature correction unit 19 are supplied to a panel gamma processing unit 20 and are subjected to gamma correction based on display characteristics of the image display panel 30.

The image data and the synchronous data output by the panel gamma processing unit 20 are supplied to the color temperature correction unit 21. The color temperature correction unit 21 performs color temperature correction by bias correction based on the detection of the light emission luminance of the dummy pixels.

The image data and the synchronous data corrected by the color temperature correction unit 21 are supplied from an output unit 22 to the image display panel 30. The image display panel 30 performs synchronization processing on the image data supplied at a timing instructed from a timing generation unit 23 processing the synchronous data, so that an image is displayed with the image data.

The processing of each unit is performed under the control of a CPU 26 which is a control unit. A memory 27 serving as a storage unit is connected to the CPU 26 and the memory 27 stores various kinds of data necessary for control. Data necessary for the correction (color temperature correction) of the luminance of each pixel is also stored in the memory 27. Data of the integrated value of the light emission luminance of a specific pixel, which is necessary for correction of the joint areas of the display panel, is also stored in the memory 27.

Detection data from a temperature sensor 28 and an optical sensor 29 is configured to be supplied to the CPU 26. The temperature sensor 28 is a sensor which detects the panel temperature of the image display panel 30 or the temperature of the vicinity of the image display panel 30.

The optical sensor 29 is a sensor which detects the light emission luminance of the pixels of the dummy pixel display area of the image display panel 30. The optical sensor 29 includes four detection units for the four dummy pixel areas d-A, d-B, d-C, and d-D (see FIGS. 1A and 1B). The detection units individually detect the light emission luminance of the four dummy pixel areas d-A, d-B, d-C, and d-D, respectively.

FIG. 5 is a diagram illustrating the detailed processing configuration associated with the color temperature correction of the image display apparatus according to this embodiment. In FIG. 5, only the control configuration associated with the color temperature correction of the CPU 26 is shown.

The CPU 26 is connected to the memory 27, the temperature sensor 28, and the optical sensor 29 via an interface unit 267. The CPU 26 includes a luminance correction sequence control unit 261. An optical sensor signal processing unit 262 and a temperature sensor signal processing unit 263 each detect the sensor, output under the control of the luminance correction sequence control unit 261. The obtained detection data are supplied to an optical sensor signal temperature correction unit 264. Then, the optical sensor signal temperature correction unit 264 corrects an optical sensor signal based on a detected temperature and calculates correction values based on a corrected optical sensor detection signal of each corrected dummy area. The correction values are calculated as a bias correction value and a gain correction value of each area by the area bias correction value calculation unit 265 and an area gain correction value calculation unit 266.

The joint correction unit 17 includes a line signal sampling unit 171, an acceleration calculation and history addition unit 172 and a normalization calculation unit 173. The line signal sampling unit 171 samples a signal of the joint area. The sampled signal is supplied to the acceleration calculation and history addition unit 172 to calculate a history addition value to be supplied and stored in the memory 27. A normalization value is calculated by the normalization calculation unit 173. The calculated normalization value is supplied to the color temperature correction unit 19 performing gain correction and the color temperature correction unit 21 performing bias correction.

The dummy pixel display processing unit 18 includes an area signal sampling unit 181, a dummy display reference signal generation unit 182, a dummy signal conversion unit 183, and an adder 184. When a signal sampled by the area signal sampling unit 181 is displayed and when a reference signal generated by the dummy display reference signal generation unit 182 is displayed, the conversion is performed by the dummy signal conversion unit 183 and the addition to an image signal at the corresponding position is performed by the adder 184.

In the color temperature correction unit 19, a correction gain of each division area is calculated by a gain correction calculation unit 191 based on the correction value calculated for each area by the area gain correction value calculation unit 266 and the normalization value. Then, the calculated correction gain is supplied to a multiplier 192 and is multiplied by a driving signal of the pixel in the corresponding area of the image data.

In the color temperature correction unit 21, a bias correction calculation unit 211 calculates a bias correction value of each division area based on the correction value calculated for each area by the area bias correction value calculation unit 265 and the normalization value. Then, the calculated bias correction value is supplied to a multiplier 212 and is multiplied by a driving signal of the pixel in the corresponding area of the image data.

3. Exemplary Setting of Area Division and Dummy Pixel According to Embodiment Next, setting of each division area and the dummy pixel of the image display panel will be described in detail with reference to FIGS. 6 and 7.

FIG. 6 is a diagram illustrating a detailed example of each division area of the image display panel. As shown in FIG. 6, the effective image display area is an area where the pixels are arranged at an aspect ratio at which an image with a raster size of 16:9 is displayed. The effective image display area has 540 vertical pixels×960 horizontal pixels.

The division area A is a middle area which has 400 vertical pixels×720 horizontal pixels. The division area A is an area serving as an image display area when images with most raster sizes shown in FIGS. 3A to 3H are displayed.

The division areas B are areas which are located at the right and left ends and each have 400 vertical pixels×30 horizontal pixels.

The division areas C are areas which are located at the upper and lower ends and each have 10 vertical pixels×720 horizontal pixels.

The division areas D are areas which are located at the four corners and each have 10 vertical pixels×30 horizontal pixels.

The joint areas N1 and N2 are areas which each have 540 vertical pixels×90 horizontal pixels.

The joint areas N3 and N4 are areas which each have 60 vertical pixels×960 horizontal pixels.

The pixel areas d-A, d-B, d-C, and d-D within the ineffective area each have 100 pixels of 10 vertical pixels×10 horizontal pixels and are separated from each other by 40 pixels in the vertical direction.

Signals input to the dummy pixel include two kinds of signals: an aging signal which is a normally input image signal and a reference signal input when luminance is measured.

FIG. 7 is a diagram illustrating an example of the aging signal displayed in the dummy pixel. Signals corresponding to 100 pixels in the dummy pixel area d-A are obtained by sampling signals corresponding to 100 pixels in the area A nearly at a uniform interval. In this example, the signals at positions indicated by circles of the numeral numbers from 1 to 100 in the area A in FIG. 7 are sampled and allow 100 pixels in the dummy pixel area d-A to perform light emission.

As shown in FIG. 7, the signals of 100 pixels in the dummy pixel area d-B are obtained by sampling the signals of 50 pixels in the left area B at a nearly uniform interval and the signals of 50 pixels in the right area B at a nearly uniform interval.

As shown in FIG. 7, the signals of 100 pixels in the dummy pixel area d-C are obtained by sampling the signals of 50 pixels in the upper area C at a nearly uniform interval and the signals of 50 pixels in the lower area C at a nearly uniform interval.

As shown in FIG. 7, the signals of 100 pixels in the dummy pixel area d-D are obtained by sampling the signals of 25 pixels in each of the left upper, left lower, right upper, and right lower areas D at a nearly uniform interval.

4. Exemplary Correction Processing According to Embodiment

FIGS. 8A to 8C are diagrams illustrating processed states of the correction on the chromaticity and the luminance using signals of the dummy pixels.

In the image display apparatus according to this embodiment, output values of the optical sensor 29 obtained by allowing the dummy pixels to display reference signals (refsig_L and refsig_H) of high luminance and low luminance are stored in advance as reference output values (refout_L and refout_H) in the memory 27 in a factory or the like when the image display apparatus is manufactured.

When the image display apparatus displays an image, the reference signals (refsig_L and refsig_H) are input to the dummy pixels, so that the output values of the optical sensor at that time are compared to the reference output values.

In a case where there is a difference equal to or larger than a given level as the comparison result, correction is performed in such a manner that a signal is added at a given ratio at which a sensor output value is the same as the reference output value (refout_L) when inputting the reference signal (refsig_L). Moreover, correction is performed in such a manner that the gain of a signal is corrected at a given ratio at which the sensor output value is the same as the reference output value (refout_H) when inputting the reference signal (refsig_H). This correction is performed on the red pixels, the blue pixels, and the green pixels.

That is, as shown in FIG. 8A, it is assumed that the characteristic before deterioration and the output value (characteristic after deterioration) of the optical sensor can be obtained using two reference signals before correction. At this time, as shown in FIG. 8B, bias correction is performed, as bias correction which is gray scale correction, so that the reference output value (refout_L) with lower luminance becomes the characteristic before deterioration. Moreover, as shown in FIG. 8C, the gain of the signal is corrected, as the gain correction which is slope correction, so as to have a given ratio which is the same as that of the reference output value (refout_H) with higher luminance.

By applying the corrected values obtained in this manner to the display signal of the actual effective screen, it is possible to perform chromaticity and luminance correction for the display screen. The correction processing using the corrected values is performed in the configuration shown in FIG. 5.

5. Exemplary Processing of Joint Area According to Embodiment

Next, the chromaticity and luminance correction in the joint areas N1 to N4 will be described with reference to FIG. 9A to FIG. 11.

Figure 9A:
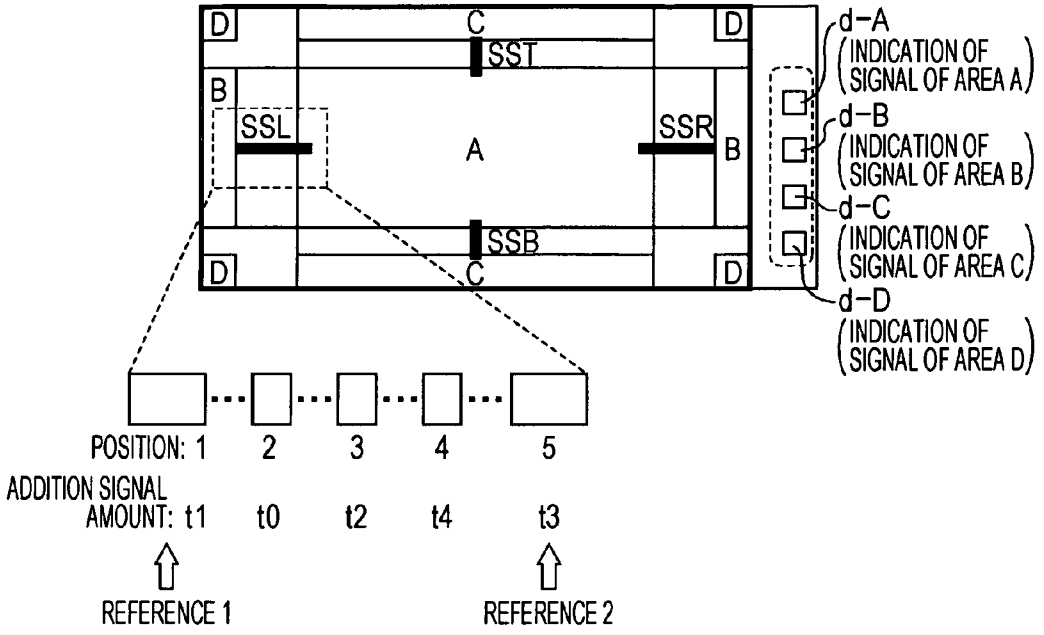
FIGS. 9A and 9B are diagrams illustrating correction of the joint according to the embodiment of the invention.
Figure 9B:
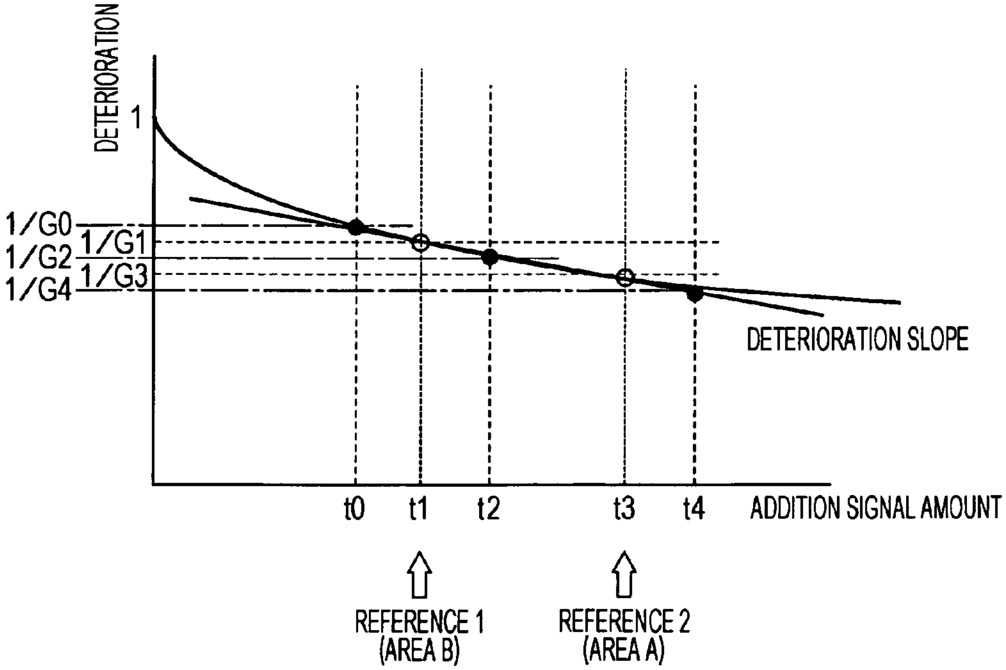

FIGS. 9A and 9B are diagrams illustrating the correction principle in the joint areas.

The deterioration state of the pixels in the joint areas N1 to N4 shown in FIG. 6 is different depending on how long images with a certain size are displayed. Therefore, it is necessary to know at which position and how long the images are displayed.

Therefore, in the joint areas N1 to N4, the display signals are sampled in a line shape and the amount of integrated signal history is maintained as the light emission history of the pixels. That is, as shown in FIG. 9A, a sampling line SSL in which image signals displayed in a line shape are sampled is set between the division area A and the left division area B. A sampling line SSR in which image signals displayed in a line shape are sampled is set between the division area A and the right division area B. A sampling line SST in which image signals displayed in a line shape are sampled is set between the division area A and the upper division area C. A sampling line SSB in which image signals displayed in a line shape are sampled is set between the division area A and the lower division area C.

The overview of each sampling line will be described by using the sampling line SSL between the division area A and the left division area B in FIG. 9A as an example. Five Sampling positions are set from position 1 to position 5. Sampling position 1 at the left end is the end of the division area B and serves as reference 1. Sampling position 5 at the right end is the end of the division area A and serves as reference 2.

Three sampling positions 2, 3, and 4 are located between position 1 and position 5. At these positions, the display signals of the pixels in the joint area N1 are sampled. Only the five sampling positions are set here for facilitating simple description. The number of sampling positions is different from the actual number of sampling positions.

The sampling signals at position 1 to position 5 are sampled, as necessary, after the image display apparatus starts to be used. Then, the values of the sampling signals are integrated as an integrated value (integrated signal amount) and are stored in the memory 27. Thus, the sampling positions of the signal and the cumulative value of the display signals at the positions can be known. In the example of FIG. 9A, it is assumed that t1, t0, t2, t4, and t3 are integrated as signal amounts of positions 1, 2, 3, 4, and 5, respectively.

A deterioration slope is calculated from the deterioration degrees (inverse number of the gain correction value) of the both areas (the areas B and A) where the signals serving as references in the line shape are sampled and the integrated signal amounts of the areas. FIG. 9B is a diagram illustrating the deterioration slope. In FIG. 9B, the horizontal axis represents an integrated signal amount and the vertical axis represents the deterioration state. The deterioration slope can be calculated by binding reference 1 of sampling position 1 (area B) and reference 2 of sampling position 5 (area A). That is, the inclined slope is calculated from the deterioration degrees (inverse number of the gain correction value) of the both areas (area B and A) where the signals in the line shape are sampled and the integrated signal amounts.

For example, the integrated signal amount at position 3 is t2. As shown in FIG. 9B, the deterioration amount at position 3 is [deterioration degree=deterioration slope×integrated signal amount].

Since the inverse number of the deterioration degree is the grain correction value, the gain correction value at position 3 in the joint area N1 can be calculated from the inverse number of the deterioration degree. The other joint areas N2, N3, and N4 are also processed in the same way.

In FIGS. 9A and 9B, the principle of the processing in the joint area is shown. In this embodiment, the sampling lines are set as in FIG. 10.

Figure 10:
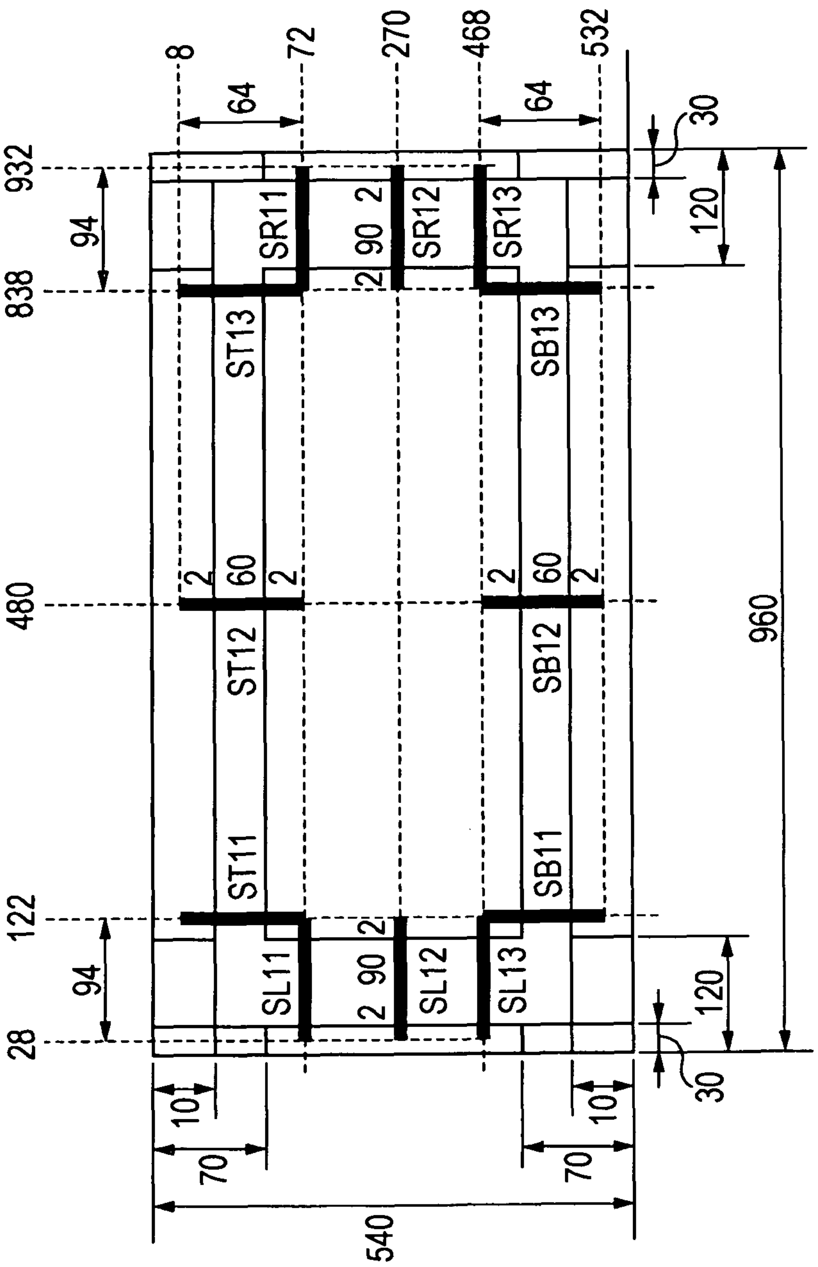
FIG. 10 is a diagram illustrating an example of sampling signals of the joint according to the embodiment of the invention.

That is, as shown in FIG. 10, three sampling lines SL11, SL12, and SL13 are set between the division area A and the left division area B. Three sampling lines SR11, SR12, and SR13 are set between the division area A and the right division area B. Three sampling lines ST11, ST12, and ST13 are set between the division area A and the upper division area C. Three sampling lines SB11, SB12, and SB13 are set between the division area A and the lower division area C.

As shown in FIG. 10, the three sampling lines at the respective positions are set at the vicinity of one end, nearly the middle, and the vicinity of the other end of the corresponding joint area.

The sampling position of the sampling lines at the three positions set for each joint area is changed so that one of the sampling lines is subjected to sampling, whenever the sampling is performed.

For example, for the sampling lines SL11, SL12, and SL13 between the division area A and the left division area B, the sampling position is changed from ST11→ST12→ST13→ST11 whenever the sampling is performed. Likewise, the sampling position is changed for the signals of the other areas.

When each area is set so as to have the number of pixels shown in FIG. 10, the sampling position (address position of the pixel) of each sampling line is set, for example, under the following condition of [Expression 1].

[Expression 1]

$$ST11 \quad \left.\begin{array}{l} h = 122 \\ 8 < v \le 72 \end{array}\right\} X[122],\ Y[9:72] \qquad 1)$$

$$ST12 \quad \left.\begin{array}{l} h = 480 \\ 8 < v \le 72 \end{array}\right\} X[480],\ Y[9:72] \qquad 2)$$

$$ST13 \quad \left.\begin{array}{l} h = 839 \\ 8 < v \le 72 \end{array}\right\} X[839],\ Y[9:72] \qquad 3)$$

$$SB11 \quad \left.\begin{array}{l} h = 122 \\ 468 < v \le 532 \end{array}\right\} X[122],\ Y[469:532] \qquad 4)$$

$$SB12 \quad \left.\begin{array}{l} h = 480 \\ 468 < v \le 532 \end{array}\right\} X[480],\ Y[469:532] \qquad 5)$$

$$SB13 \quad \left.\begin{array}{l} h = 839 \\ 468 < v \le 532 \end{array}\right\} X[839],\ Y[469:532] \qquad 6)$$

$$SL11 \quad \left.\begin{array}{l} 28 < h \le 122 \\ v = 72 \end{array}\right\} X[29:122],\ Y[72] \qquad 7)$$

$$SL12 \quad \left.\begin{array}{l} 28 < h \le 122 \\ v = 270 \end{array}\right\} X[29:122],\ Y[270] \qquad 8)$$

$$SL13 \quad \left.\begin{array}{l} 28 < h \le 122 \\ v = 469 \end{array}\right\} X[29:122],\ Y[469] \qquad 9)$$

$$SR11 \quad \left.\begin{array}{l} 838 < h \le 932 \\ v = 72 \end{array}\right\} X[839:932],\ Y[72] \qquad 10)$$

-continued $$SR12 \qquad 11)$$

$$\left.\begin{array}{l}838 < h \leq 932\\ v = 270\end{array}\right\} X[839:932],\ Y[270]$$

$$SR13 \qquad 12)$$

$$\left.\begin{array}{l}838 < h \leq 932\\ v = 469\end{array}\right\} X[839:932],\ Y[469]$$

At the address position determined in this manner, the signals of the pixels of three colors (red r, green g, and blue b) are subjected to sampling, as shown in [Expression 2].

$$ST11\sim13\_r[15:0], ST11\sim13\_g[15:0], ST11\sim13\_b[15:0] SB11\sim13\_r[15:0], SB11\sim13\_g[15:0], SB11\sim13\_b[15:0] SL11\sim13\_r[15:0], SL11\sim13\_g[15:0], SL11\sim13\_b[15:0] SR11\sim13\_r[15:0], SR11\sim13\_g[15:0], SR11\sim13\_b[15:0] \qquad \text{[Expression 2]}$$

Figure 11:
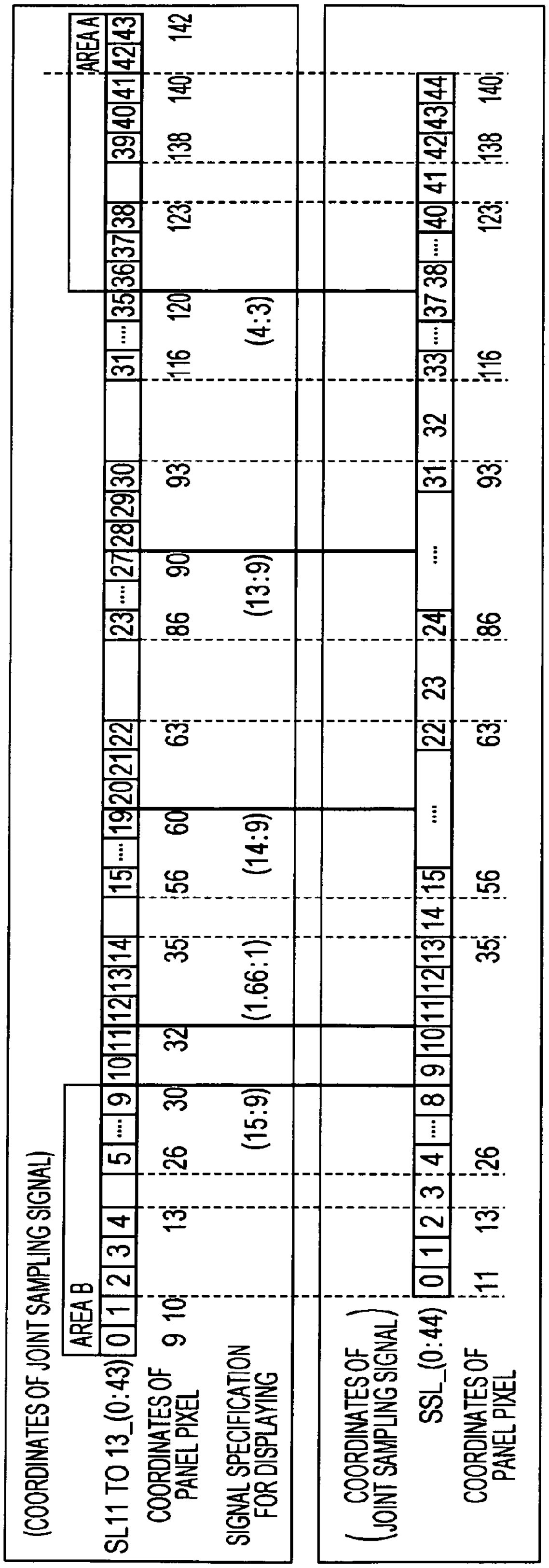
FIG. 11 is a diagram illustrating an example of the coordinates of the joint according to the embodiment of the invention.
Figure 12A:
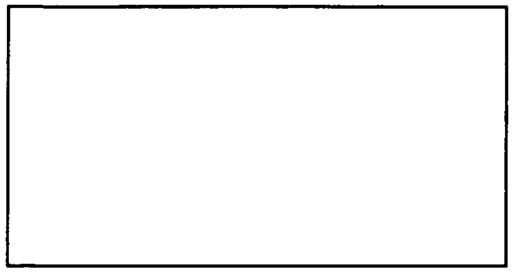
FIGS. 12A to 12C are diagrams illustrating examples of raster sizes.
Figure 12B:
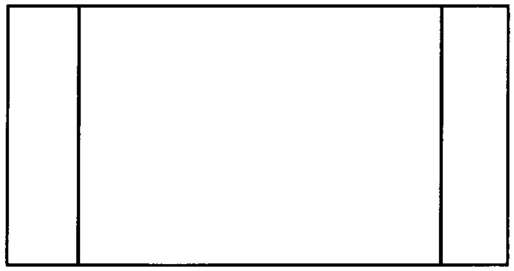
Figure 12C:
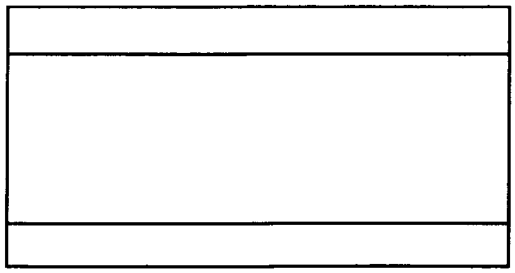
Figure 13A:
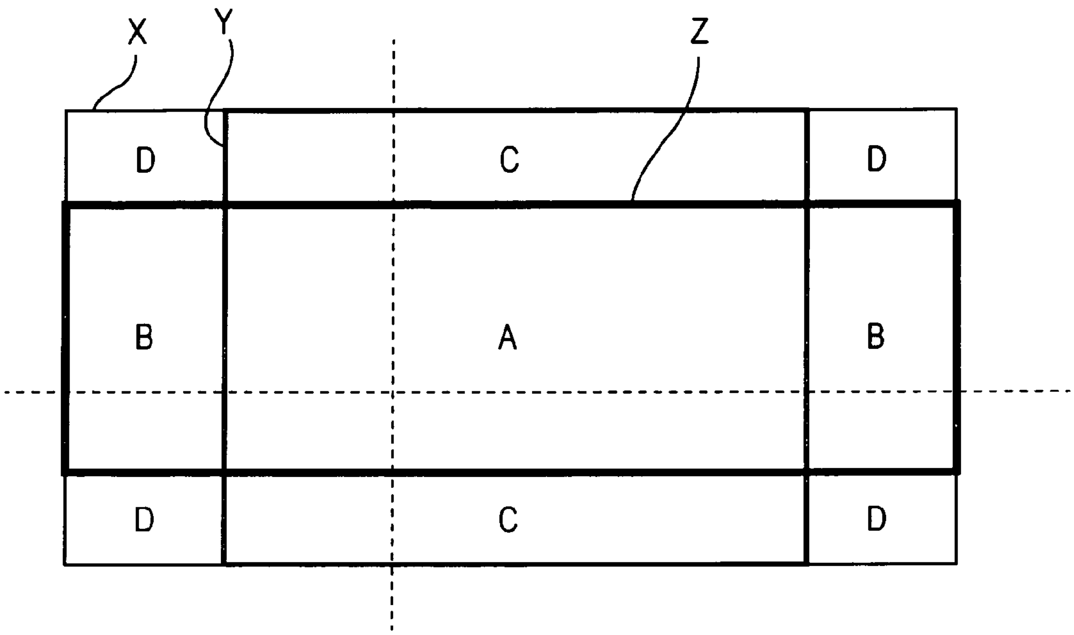
FIGS. 13A and 13B are diagrams illustrating the difference in the deterioration of the areas caused in the difference in the raster sizes in FIGS. 12A to 12C.
Figure 13B:
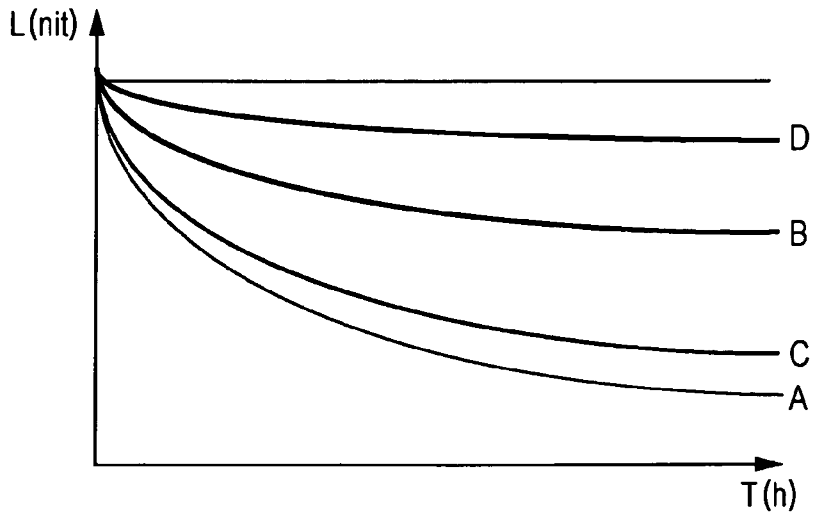

FIG. 11 is a diagram illustrating an example of respective sampling positions of the sampling lines of the joint.

In the upper part of FIG. 11, an example of the sampling lines SL11 to SL13 of the joint is shown. In this example, the sampling lines include 44 sampling signals at sampling position 0 to sampling position 43. The coordinates of the pixels of the panel shown in the lower part of the respective sampling positions are the positions of the pixels shown in FIG. 10.

The pixels at the end of the area B are sampled from sampling position 0 to sampling position 9. The pixels at the end of the area A are sampled from sampling position 36 to sampling position 43.

Non-uniform sampling positions are set from sampling position 10 to sampling position 35. The reason for setting the non-uniform sampling positions is to chiefly select the pixels in which a boundary portion between the image area with a raster size likely to be displayed and the non-display area is likely to be present.

Specifically, sampling position 5 to sampling position 14 are continuously set between pixel position 26 to pixel position 35, and the state in the vicinity of the boundary portion of a raster size (15:9) and a raster size (1.66:1) is detected at the sampling positions.

Sampling position 56 to sampling position 63 are continuously set between pixel position 15 to pixel position 22, and the state in the vicinity of the boundary portion of a raster size (14:9) is detected at the sampling positions.

Sampling position 23 to sampling position 30 are continuously set between pixel position 86 to pixel position 93, and the state in the vicinity of the boundary portion of a raster size (13:9) is detected at the sampling positions.

Sampling position 31 to sampling position 38 are continuously set between pixel position 116 to pixel position 123, and the state in the vicinity of the boundary portion of a raster size (4:3) is detected at the sampling positions.

The sampling (sampling positions 0 to 4) at pixel positions 9 to 13 are performed to obtain a reference signal of the area B. The sampling (sampling positions 39 to 43) at pixel positions 138 to 142 are performed to obtain a reference signal of the area A.

The sampling signals of the joint are converted at the coordinates of the correction signals of the joint shown in the lower part of FIG. 11. The correction signals of the joint are also generated for the signals of the pixels which are not sampled.

Specifically, for example, there are the sampling signals at pixel position 35 and pixel position 56, but there are no sampling signals at pixel position 36 to pixel position 55. Here, a correction signal (signal indicated by reference number 14) at the position at which there is no sampling signal is generated from the average of the sampling signal of pixel position 36 and the sampling signal of pixel position 55.

Likewise, the correction signals are generated for all of the pixels in the joint area N1.

The gain correction of each of the pixels in the joint area N1 is performed using the obtained correction signals. The obtained correction signals are signals obtained along the sampling lines, as shown in FIG. 11, but the same correction is performed on respective pixels in a direction perpendicular to the sampling line.

Thus, by performing the correction in the joint areas, appropriate correction is performed in the areas, where the deterioration state is not directly detected from the dummy pixels, using the cumulative value of the display state stored in the memory. Then, even when an image with a certain raster size is displayed, appropriate correction can be performed.

In this embodiment, as shown in FIG. 11, the sampling positions in the sampling lines can be set as the positions corresponding to the raster size highly likely to be displayed. Therefore, since data of a relatively small sampling number are cumulated, memory capacity can be reduced.

6. Modified Examples

The arrangement state of the division areas or the joint areas shown in the respective drawings, the sampling positions and the sampling number in the joint areas, and the like are illustrated as just suitable examples. The invention is not limited to these examples.

In the above-described embodiments, as shown in FIG. 6, the four kinds of areas A, B, C, and D are set and the dummy pixels are provided. However, no dummy pixel may be provided in the four corner areas D. The pixel state of the four corner areas D can be estimated from the states of the areas B and C. The correction may be performed without actually measuring the pixel state using the dummy pixels.

Even in the sampling lines of the joint areas, as shown in FIG. 10, the sampling lines are sequentially changed as the sampling lines at the three positions, but the configuration may be simplified by setting the sampling line at one position. Alternatively, by simultaneously performing the sampling in the sampling lines at the three positions, sampling precision may be improved.

The organic EL panel is used as an example of the image display panel. However, other types of image display panels may be applied, as long as deterioration occurs due to the self emission of the pixels. The number of pixels of the panel is just an example of the above-described embodiments. Of course, the other numbers of pixels may be applied to the panel.

It should be understood by those skilled in the art that various modifications, combinations, sub-combinations and alterations may occur depending on design requirements and other factors insofar as they are within the scope of the appended claims or the equivalents thereof.

What is claimed is:

1. An image display apparatus comprising:
- a display panel including an image display area and a dummy pixel area different from the image display area;
- an optical sensor detecting light emission luminance of the dummy pixel area on the display panel; and
- a control unit dividing the image display area on the display panel into a plurality of division areas, allowing pixels within the dummy pixel area to perform light emission to the same degree as the light emission of one or a plurality of pixels within each division area, and correcting luminance or chromaticity of the pixels within each division area based on the light emission luminance of the dummy pixel area detected by the optical sensor, wherein the division areas on the display panel are set so as to correspond to non-emission areas occurring due to a difference between an aspect ratio of an image displayed in the image display area and an aspect ratio of the image display area, wherein a division area having no dummy pixel performing the light emission corresponding to a driving state of the pixels in the division area is set as the division area on the display panel, wherein the image display apparatus further comprises a memory unit integrating and storing a light emission history of specific pixels in the division area having no dummy pixel, wherein the control unit corrects the light emission luminance or chromaticity of the pixels in the division area having no dummy pixel from the light emission history stored in the memory unit, wherein the division area having no dummy pixel is located at a position between the plurality of division areas having the corresponding dummy pixels, and wherein the light emission luminance of the pixels in the division area having no dummy pixel is corrected using the light emission luminance of the dummy pixels of the adjacent division area and an integrated value of the light emission luminance stored in the memory unit.

2. The image display apparatus according to claim 1, wherein specific pixels of which the light emission history is integrated and stored are pixels selected from a sampling line, in which a plurality of pixels is arranged in a straight line shape, in the division area having no dummy pixel.

3. The image display apparatus according to claim 2, wherein a plurality of positions of the sampling line in which the plurality of pixels is arranged in the straight line shape is set and sampling is performed and integrated by alternately selecting the plurality of sampling lines.

4. The image display apparatus according to claim 1, further comprising:

a temperature sensor, wherein the control unit corrects luminance of the pixel based on a temperature detected by the temperature sensor.

5. An image display method comprising the steps of:

detecting light emission luminance of a dummy pixel area of a display panel having the dummy pixel area different from an image display area;

dividing the image display area on the display panel into a plurality of division areas and allowing pixels within the dummy pixel area to perform light emission to the same degree as the light emission of one or a plurality of pixels within each division area; and correcting luminance or chromaticity of the pixels within each division area based on the light emission luminance of the dummy pixel area detected by an optical sensor, wherein the division areas on the display panel are set so as to correspond to non-emission areas occurring due to a difference between an aspect ratio of an image displayed in the image display area and an aspect ratio of the image display area, wherein a division area having no dummy pixel performing the light emission corresponding to a driving state of the pixels in the division area is set as the division area on the display panel, wherein the method further comprises integrating and storing a light emission history of specific pixels in the division area having no dummy pixel in a memory unit, wherein the correcting step corrects the light emission luminance or chromaticity of the pixels in the division area having no dummy pixel from the light emission history stored in the memory unit, wherein the division area having no dummy pixel is located at a position between the plurality of division areas having the corresponding dummy pixels, and wherein the light emission luminance of the pixels in the division area having no dummy pixel is corrected using the light emission luminance of the dummy pixels of the adjacent division area and an integrated value of the light emission luminance stored in the memory unit.

* * * * *